United States Patent
Katsuta et al.

(10) Patent No.: US 12,134,217 B2
(45) Date of Patent: Nov. 5, 2024

(54) METHOD FOR PRODUCING INJECTION-MOLDED BODY

(71) Applicant: KANEKA CORPORATION, Osaka (JP)

(72) Inventors: Yuta Katsuta, Settsu (JP); Nobuo Nakamura, Settsu (JP); Shunsuke Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 368 days.

(21) Appl. No.: 17/627,428

(22) PCT Filed: Jun. 8, 2020

(86) PCT No.: PCT/JP2020/022526
§ 371 (c)(1),
(2) Date: Jan. 14, 2022

(87) PCT Pub. No.: WO2021/010054
PCT Pub. Date: Jan. 21, 2021

(65) Prior Publication Data
US 2022/0258387 A1    Aug. 18, 2022

(30) Foreign Application Priority Data

Jul. 16, 2019 (JP) .................. 2019-131277

(51) Int. Cl.
| | |
|---|---|
| B29C 45/00 | (2006.01) |
| C08G 63/06 | (2006.01) |
| C08K 3/34 | (2006.01) |
| B29C 45/72 | (2006.01) |
| B29K 105/00 | (2006.01) |
| B29K 509/02 | (2006.01) |

(52) U.S. Cl.
CPC .......... B29C 45/0013 (2013.01); C08G 63/06 (2013.01); C08K 3/346 (2013.01); B29C 45/7207 (2013.01); B29K 2105/0085 (2013.01); B29K 2509/02 (2013.01)

(58) Field of Classification Search
None
See application file for complete search history.

(56) References Cited

U.S. PATENT DOCUMENTS

| | | |
|---|---|---|
| 2008/0033077 A1 | 2/2008 | Hashimoto et al. |
| 2016/0251494 A1* | 9/2016 | Koyama .............. C08K 3/26 524/14 |
| 2017/0198313 A1* | 7/2017 | Kobayashi ............ C08G 63/06 |
| 2018/0105639 A1 | 4/2018 | Arnold et al. |

FOREIGN PATENT DOCUMENTS

| | | |
|---|---|---|
| EP | 2 913 360 A1 | 9/2015 |
| EP | 3 266 831 A1 | 1/2018 |
| EP | 3 415 565 A1 | 12/2018 |
| JP | 2005 255 721 A * | 9/2005 |
| JP | 2010 082 838 A * | 4/2010 |
| JP | 2010-82838 A | 4/2010 |
| JP | 2011/132281 A | 7/2011 |
| JP | 2012/211243 A | 11/2012 |
| WO | WO 2015/052876 A1 | 4/2015 |
| WO | WO 2015/146195 A1 | 10/2015 |

OTHER PUBLICATIONS

Talc Technology pamphlet of Fuji Talc Industrial co, Ltd. http://www.fuji-talc.co.jp/blog/wp-content/uploads/2022/10/FUJI-TALC-pamphlet.pdf (Year: 2022).*
International Search Report mailed on Jul. 21, 2020 in PCT/JP2020/022526 filed on Jun. 8, 2020 (2 pages).
Kershaw, P.J., "Biodegradable Plastics and Marine Litter. Misconceptions, concerns and impacts on marine environments", United Nations Environment Programme (UNEP), 2015, 38 total pages.

* cited by examiner

*Primary Examiner* — Mohammad M Ameen
(74) *Attorney, Agent, or Firm* — Oblon, McClelland, Maier & Neustadt, L.L.P.

(57) ABSTRACT

A method for producing an injection-molded body from a molding material containing a poly(3-hydroxybutyrate) resin includes: melting the molding material by heating the molding material to a temperature between a melting point peak temperature and a melting point peak end temperature in differential scanning calorimetry analysis of the molding material, wherein the difference between the melting point peak temperature and the melting point peak end temperature of the molding material is from 10 to 70° C.; injecting the molten molding material into a mold having a temperature of 30 to 80° C.; and cooling the molding material in the mold to crystallize and solidify the molding material.

17 Claims, No Drawings

METHOD FOR PRODUCING INJECTION-MOLDED BODY

TECHNICAL FIELD

The present invention relates to a method for producing an injection-molded body containing a poly(3-hydroxybutyrate) resin.

BACKGROUND ART

In recent years, separate collection and composting of raw garbage have been promoted especially in Europe, and plastic products that can be composted together with raw garbage have been desired.

In the meantime, environmental problems caused by waste plastics have become an issue of great concern. In particular, it has been found that a huge amount of plastics dumped at seas or carried into seas through rivers are drifting in all oceans on the Earth. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder that marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous substances present in seawater, and marine creatures ingest the microplastic particles with the adsorbed hazardous substances, so that the hazardous substances are introduced into the food chain.

The use of biodegradable plastics is expected as means for addressing the plastics-induced marine pollution as described above. However, a report issued by the United Nations Environment Programme in 2015 (Non Patent Literature 1) states that plastics such as polylactic acid that can be biodegraded through compositing are not expected to be degraded quickly in the actual oceans whose temperatures are low and cannot therefore be used as a countermeasure against the marine pollution.

Under these circumstances, poly(3-hydroxybutyrate) resins, which can be biodegraded even in seawater, are attracting attention as a promising solution to the above problems.

However, poly(3-hydroxybutyrate) resins have a low crystallization speed, because of which molding of a poly(3-hydroxybutyrate) resin requires a long cooling time for solidification following heating and melting of the resin. This leads to low productivity.

To address this problem, Patent Literature 1 describes mixing a poly(3-hydroxybutyrate) resin with pentaerythritol serving as a crystal nucleating agent, thereby improving the solidification characteristics of the poly(3-hydroxybutyrate) resin to increase the speed of a molding process such as injection molding.

CITATION LIST

Patent Literature

PTL 1: WO 2015-052876

Non Patent Literature

NPL 1: BIODEGRADABLE PLASTICS & MARINE LITTER, United Nations Environment Programme 2015

SUMMARY OF INVENTION

Technical Problem

The invention descried in Patent Literature 1 can increase the speed of molding of the poly(3-hydroxybutyrate) resin. However, pentaerythritol used as a crystal nucleating agent could adhere to the surface of the mold during injection molding and soil the mold. In particular, it has been found that the degree of soiling is high in the case where the surface of the mold is textured.

In view of the above circumstances, the present invention aims to provide a method for producing an injection-molded body, the method being adapted to perform injection molding of a poly(3-hydroxybutyrate) resin-containing molding material with high productivity without using any crystal nucleating agent that can cause mold soiling.

Solution to Problem

As a result of intensive studies with the goal of solving the above problems, the present inventors have found that when a poly(3-hydroxybutyrate) resin-containing molding material having particular melting properties is injection-molded under particular temperature conditions, an injection-molded body composed primarily of the poly(3-hydroxybutyrate) resin can be produced with high productivity without using any crystal nucleating agent that can cause mold soiling. Based on this finding, the inventors have completed the present invention.

Specifically, the present invention relates to a method for producing an injection-molded body from a molding material containing a poly(3-hydroxybutyrate) resin, the method including: melting the molding material by heating the molding material to a temperature between a melting point peak temperature and a melting point peak end temperature in differential scanning calorimetry analysis of the molding material, wherein the difference between the melting point peak temperature and the melting point peak end temperature of the molding material is from 10 to 70° C.; injecting the molten molding material into a mold having a temperature of 30 to 80° C.; and cooling the molding material in the mold to crystallize and solidify the molding material. Preferably, an injection rate of the molding material during injection molding is from 1 to 30 cc/sec. Preferably, the poly(3-hydroxybutyrate) resin includes poly(3-hydroxybutyrate-co-3-hydroxyhexanoate). Preferably, the molding material contains 0 to 40 parts by weight of an inorganic filler per 100 parts by weight of the poly(3-hydroxybutyrate) resin. Preferably, the inorganic filler is a silicate. More preferably, the silicate is at least one selected from the group consisting of talc, mica, kaolinite, montmorillonite, and smectite.

Advantageous Effects of Invention

The present invention can provide a method for producing an injection-molded body, the method being adapted to perform injection molding of a poly(3-hydroxybutyrate) resin-containing molding material with high productivity without using any crystal nucleating agent that can cause mold soiling.

DESCRIPTION OF EMBODIMENTS

Hereinafter, embodiments of the present invention will be described. The present invention is not limited to the embodiments described below.

The poly(3-hydroxybutyrate) resin in the present invention is an aliphatic polyester resin producible by microorganisms and containing at least 3-hydroxybutyrate as a repeating unit. The poly(3-hydroxybutyrate) resin may be poly(3-hydroxybutyrate) which contains only 3-hydroxybutyrate as the repeating unit or may be a copolymer of 3-hydroxybutyrate and another hydroxyalkanoate. The poly(3-hydroxybutyrate) resin may be a mixture of a homopolymer and one or more copolymers or a mixture of two or more copolymers.

Specific examples of the poly(3-hydroxybutyrate) resin include poly(3-hydroxybutyrate), poly(3-hydroxybutyrate-co-3-hydroxyhexanoate), poly(3-hydroxybutyrate-co-3-hydroxyvalerate), poly(3-hydroxybutyrate-co-4-hydroxybutyrate), poly(3-hydroxybutyrate-co-3-hydroxyoctanoate), and poly(3-hydroxybutyrate-co-3-hydroxyoctadecanoate). Among these, poly(3-hydroxybutyrate), poly(3-hydroxybutyrate-co-3-hydroxyhexanoate), poly(3-hydroxybutyrate-co-3-hydroxyvalerate), and poly(3-hydroxybutyrate-co-4-hydroxybutyrate) are preferred as they are easy to industrially produce.

Poly(3-hydroxybutyrate-co-3-hydroxyhexanoate) is more preferred for the following reasons: the ratio between the repeating units can be varied to change the melting point and crystallinity and adjust the physical properties such as the Young's modulus and heat resistance to levels intermediate between those of polypropylene and polyethylene; and this plastic is easy to industrially produce as mentioned above and useful in terms of physical properties. Poly(3-hydroxybutyrate) resins have the property of being thermally decomposed easily under heating at 180° C. or higher and, in particular, poly(3-hydroxybutyrate-co-3-hydroxyhexanoate) has a low melting point and is moldable at low temperature. Poly(3-hydroxybutyrate-co-3-hydroxyhexanoate) is preferred also in this respect.

As for the ratio between the repeating units of poly(3-hydroxybutyrate-co-3-hydroxyhexanoate), the 3-hydroxybutyrate unit/3-hydroxyhexanoate unit ratio is preferably from 80/20 to 99/1 (mol/mol) and more preferably from 75/15 to 97/3 (mol/mol) in terms of the balance between flexibility and strength. This is because the ratio is preferably 99/1 or less in terms of flexibility and because the ratio is preferably 80/20 or more in order for the resin to have a suitable hardness.

An example of commercially-available poly(3-hydroxybutyrate-co-3-hydroxyhexanoate) is "Kaneka Biodegradable Polymer PHBH™" of Kaneka Corporation.

As for poly(3-hydroxybutyrate-co-3-hydroxyvalerate), although its physical properties such as the melting point and Young's modulus can be changed depending on the ratio between the 3-hydroxybutyrate component and the 3-hydroxyvalerate component, the crystallinity of poly(3-hydroxybutyrate-co-3-hydroxyvalerate) is as high as 50% or more because the two components are co-crystallized. Thus, poly(3-hydroxybutyrate-co-3-hydroxyvalerate), albeit being more flexible than poly(3-hydroxybutyrate), cannot offer sufficient improvement in terms of brittleness.

The weight-average molecular weight of the poly(3-hydroxybutyrate) resin is not limited to a particular range, but is preferably low in order to reduce shear heating during injection molding. To be specific, the weight-average molecular weight is preferably $45 \times 10^4$ or less and more preferably $30 \times 10^4$ or less. The lower limit of the weight-average molecular weight is not limited to a particular value, but the weight-average molecular weight is preferably $10 \times 10^4$ or more and more preferably $15 \times 10^4$ or more in terms of the mechanical strength of the molded body.

The weight-average molecular weight of the poly(3-hydroxybutyrate) resin can be measured as a polystyrene-equivalent molecular weight by gel permeation chromatography using a chloroform solution of the poly(3-hydroxybutyrate) resin. The columns used in the gel permeation chromatography may be any columns suitable for weight-average molecular weight measurement.

In the present invention, the poly(3-hydroxybutyrate) resin used is preferably a poly(3-hydroxybutyrate) resin for which the difference between the melting point peak temperature and the melting point peak end temperature in differential scanning calorimetry analysis is from 10 to 70° C. With the use of a poly(3-hydroxybutyrate) resin for which the temperature difference is from 10 to 70° C., a molding material can be obtained for which the difference between the melting point peak temperature and the melting point peak end temperature in differential scanning calorimetry analysis is from 10 to 70° C. When melting the molding material for which the temperature difference is from 10 to 70° C., it is easy to melt the resin while allowing some resin crystals to remain unmelted. Allowing some resin crystals to remain makes it possible for the poly(3-hydroxybutyrate) resin-containing molding material, as described later, to exhibit good solidification characteristics when subjected to injection molding.

The temperature difference in the molding material or poly(3-hydroxybutyrate) resin is more preferably 12° C. or more, even more preferably 15° C. or more, still even more preferably 18° C. or more, particularly preferably 20° C. or more, and most preferably 25° C. or more. As for the upper limit of the temperature difference, the temperature difference is preferably 50° C. or less, more preferably 40° C. or less, even more preferably 38° C. or less, still even more preferably 35° C. or less, and particularly preferably 33° C. or less in terms of the ease of production of the poly(3-hydroxybutyrate) resin.

In the present invention, the melting point peak temperature and melting point peak end temperature in differential scanning calorimetry analysis are defined as follows: An aluminum pan is charged with 4 to 10 mg of a sample; the sample is subjected to differential scanning calorimetry analysis which uses a differential scanning calorimeter and in which the sample is melted under a stream of nitrogen by increasing the temperature from 30 to 180° C. at a rate of 10° C./min; and in the endothermic curve obtained by the calorimetry analysis, the temperature at which the amount of absorbed heat reaches a maximum is determined as the melting point peak temperature, and the temperature at which the melting point peak ends and the endothermic process ceases to be observed is determined as the melting point peak end temperature. The melting point peak temperature and melting point peak end temperature are measured for the total molding material.

A poly(3-hydroxybutyrate) resin that exhibits a broad melting point peak and that contains a high-melting component can be used as the poly(3-hydroxybutyrate) resin for which the difference between the melting point peak temperature and the melting point peak end temperature is from 10 to 70° C. The poly(3-hydroxybutyrate) resin that exhibits a broad melting point peak and that contains a high-melting component and another poly(3-hydroxybutyrate) resin having different melting point properties can be used in combination.

A specific method for producing the poly(3-hydroxybutyrate) resin that exhibits a broad melting point peak and that contains a high-melting component is described, for example, in WO 2015/146194. In the described method, at least two kinds of poly(3-hydroxybutyrate) resins differing in melting point behavior are produced together in a single species of microorganism to obtain a resin mixture.

The poly(3-hydroxybutyrate) resin-containing molding material may contain an additional resin in addition to the poly(3-hydroxybutyrate) resin to the extent that the additional resin does not impair the effect of the present invention. Examples of the additional resin include: aliphatic polyester resins such as polybutylene succinate adipate, polybutylene succinate, polybutylene carbonate, polycaprolactone, and polylactic acid; and aliphatic-aromatic polyester resins such as polybutylene adipate terephthalate, polybutylene sebacate terephthalate, and polybutylene azelate terephthalate. One additional resin may be contained, or two or more additional resins may be contained.

The content of the additional resin is not limited to a particular range, but is preferably 40 parts by weight or less and more preferably 30 parts by weight or less per 100 parts by weight of the poly(3-hydroxybutyrate) resin. The lower limit of the content of the additional resin is not limited to a particular value, and the content may be 0 part by weight.

The poly(3-hydroxybutyrate) resin-containing molding material need not contain any inorganic filler, but may contain an inorganic filler in order to increase the strength of the injection-molded body.

The inorganic filler is not limited to a particular type, and may be any inorganic filler that can be added to the resin material for injection molding. Examples of the inorganic filler include: silica-based inorganic fillers such as quartz, fumed silica, silicic anhydride, molten silica, crystalline silica, amorphous silica, a filler obtained by condensation of alkoxysilane, and ultrafine amorphous silica; and other inorganic fillers such as alumina, zircon, iron oxide, zinc oxide, titanium oxide, silicon nitride, boron nitride, aluminum nitride, silicon carbide, glass, silicone rubber, silicone resin, titanium oxide, carbon fiber, mica, black lead, carbon black, ferrite, graphite, diatomite, white clay, clay, talc, calcium carbonate, manganese carbonate, magnesium carbonate, barium sulfate, and silver powder, One of these fillers may be used alone, or two ore more thereof may be used in combination.

The inorganic filler may be surface-treated in order to increase the dispersibility in the molding material. Examples of the treatment agent used for the surface treatment include higher fatty acids, silane coupling agents, titanate coupling agents, sol-gel coating agents, and resin coating agents.

The water content of the inorganic filler is preferably from 0.01 to 10%, more preferably from 0.01 to 5%, and even more preferably from 0.01 to 1% in order to reliably inhibit hydrolysis of the poly(3-hydroxybutyrate) resin. The water content can be determined according to JIS K 5101.

The average particle size of the inorganic filler is preferably from 0.1 to 100 μm and more preferably from 0.1 to 50 μm in order to ensure good properties and high processability of the molding material. The average particle size can be measured using a laser diffraction/scattering particle size analyzer such as "Microtrac MT3100II" of Nikkiso Co., Ltd.

Among inorganic fillers, those belonging to silicates are preferred since such fillers can provide an increase in heat resistance and improvement in processability. Among silicates, at least one selected from the group consisting of talc, mica, kaolinite, montmorillonite, and smectite is preferred since these silicates provide a significant increase in the mechanical strength of the injection-molded body and have a narrow particle size distribution such that they cause less deterioration in surface smoothness and mold surface transferability. Two or more silicates may be used in combination and, in this case, the types and proportions of the silicates can be adjusted as appropriate.

Examples of the talc include general-purpose talc and surface-treated talc, specific examples of which include "MICRO ACE™" of Nippon Talc Co., Ltd., "Talcan Powder™" of Hayashi Kasei Co., Ltd., and talc of Takehara Kagaku Kogyo Co., Ltd. or Maruo Calcium Co., Ltd.

Examples of the mica include wet-ground mica and dry-ground mica, specific examples of which include mica of Yamaguchi Mica Co., Ltd. or Keiwa Rozai Co., Ltd.

Examples of the kaolinite include dry kaolin, calcined kaolin, and wet kaolin, specific examples of which include "TRANSLINK" ASP™, "SANTINTONE™", and "ULTREX™" of Hayashi Kasei Co., Ltd. and kaolinite of Keiwa Rozai Co., Ltd.

The amount of the inorganic filler is preferably from 0 to 40 parts by weight per 100 parts by weight of the poly(3-hydroxybutyrate) resin. The inorganic filler need not be added; however, the addition of the inorganic filler offers the advantage of increasing the strength of the injection-molded body. In the case where the inorganic filler is added, the amount of the inorganic filler is preferably from 5 to 35 parts by weight and more preferably from 10 to 30 parts by weight. If the amount of the inorganic filler is more than 40 parts by weight, the fluidity of the molten resin could be reduced.

The poly(3-hydroxybutyrate) resin-containing molding material need not contain a crystal nucleating agent consisting of pentaerythritol. In the production method of the present invention, even when the poly(3-hydroxybutyrate) resin-containing molding material is devoid of any crystal nucleating agent, crystallization and solidification in the mold are accelerated, and an injection-molded body can be produced with high productivity. In the case where the molding material does not contain any crystal nucleating agent, soiling of the mold due to a crystal nucleating agent adhering to the mold surface can be avoided.

The poly(3-hydroxybutyrate) resin-containing molding material may contain an additive usable with the poly(3-hydroxybutyrate) resin to the extent that the additive does not impair the effect of the present invention. Examples of the additive include: colorants such as pigments and dyes; odor absorbers such as activated carbon and zeolite; flavors such as vanillin and dextrin; plasticizers; oxidation inhibitors; antioxidants; weather resistance improvers; ultraviolet absorbers; lubricants; mold releases; water repellents; antimicrobials; and slidability improvers. Only one additive may be contained or two or more additives may be contained. The contents of these additives can be chosen by those skilled in the art as appropriate depending on the intended purpose.

Specifically, the injection-molded body production method of the present invention includes the steps of: melting the poly(3-hydroxybutyrate) resin-containing molding material by heating it in a barrel of an injection molding machine and then injecting the molten resin into a mold from a nozzle connected to an end of the injection molding machine; and cooling the molten resin in the mold to solidify the resin.

In the present invention, in order to perform injection molding with high productivity, the temperature of the molding material during melting is controlled to a temperature between the melting point peak temperature and melting point peak end temperature in differential scanning calorimetry analysis of the molding material. The temperature of the molding material, as described herein, does not refer to the set temperature of the injection molding machine but to the actual temperature of the molding material during melting. The "actual temperature" is a temperature measured as follows: purging (the step of retracting the nozzle from the mold and ejecting the molten resin) is performed under conditions identical to those during molding, and then the resin is shaped into a sphere, the internal temperature of which is measured as the actual temperature by a contact thermometer. The temperature of the molding material during melting can vary depending on factors such as the set temperature of the injection molding machine and the injection rate described later. Thus, the temperature of the molding material during melting can be controlled by appropriately adjusting the above factors.

The use of the temperature conditions as described above makes it possible to melt the poly(3-hydroxybutyrate) resin to such a degree that the resin is injection-moldable and at the same time allow some resin crystals to remain in the molten resin. The remaining resin crystals act as a crystal nucleating agent for the molten resin, and thus the molten resin can be crystallized and solidified readily. As such, injection molding of the poly(3-hydroxybutyrate) resin-containing molding material can be accomplished with high productivity.

If injection molding is attempted under conditions where the temperature of the molding material during melting is below the melting point peak temperature, the injection molding could not be carried out owing to insufficient fluidity arising from the small amount of the molten resin. Even when the injection molding can be carried out, the resulting injection-molded body is likely to have appearance defects such as flow marks. If the temperature of the molding material during melting is above the melting point peak end temperature, resin crystals cannot remain in the molten resin, and thus crystallization and solidification of the molten resin are slowed. This leads to failure in release of the molded body from the mold and the failure-induced deformation of the molded body or leads to a long molding cycle and low productivity.

In the production method of the present invention, it is desirable to adjust the injection rate in order to control the temperature of the molding material during melting. Although common injection molding employs a high injection rate, the injection rate in the present invention is desirably somewhat reduced to prevent the temperature of the molding material from reaching a high temperature above the melting point peak end temperature. To be specific, the injection rate is preferably controlled to 30 cc/sec or less. This makes it possible to easily control the temperature of the molding material during melting to a temperature below the melting point peak end temperature, thus accelerating crystallization and solidification of the molten resin. The injection rate is more preferably 25 cc/sec or less and more preferably 20 cc/sec or less.

In injection molding using common resins, reducing the injection rate is not desired because a reduction in injection rate leads to increased formation of flow marks in the resulting injection-molded body. In injection molding using poly(3-hydroxybutyrate) resins, which have a lower speed of crystallization and solidification than common resins, a reduction in injection rate does not increase the formation of flow marks. The lower limit of the injection rate is not limited to a particular value, but the injection rate is preferably 1 cc/sec or more. The injection rate can be determined by the following equation.

Injection rate [cc/sec]=(Injection capacity [cc] from metering position to injection-to-holding switching position during injection molding)/(injection time [sec] excluding pressure holding time)

In the production method of the present invention, the temperature of a mold having a given shape is set in the range of 30 to 80° C., and a molten material is injected into the mold. After injection of a given amount of molten resin, the molten resin is held in the mold for a certain time to cool the molten resin, thus crystallizing and solidifying the resin into a molded body. If the set temperature of the mold is below 30° C. or above 80° C., the speed of crystallization and solidification is reduced, and the molded body is deformed when pushed out by an ejector pin. The set temperature of the mold is preferably in the range of 35 to 70° C., more preferably in the range of 38 to 60° C., and particularly preferably in the range of 40 to 50° C. The time for which the resin is held in the mold to cool the resin is not limited to a particular range, and can be chosen as appropriate by those skilled in the art in view of factors such as the shape of the molded body.

After the molten resin is cooled and solidified in the mold as described above, the mold is opened, and the molded body is pushed out by an ejector pin and released from the mold. Thus, an injection-molded body can be obtained.

Injection molding methods usable in the present invention include injection molding methods commonly used for molding of thermoplastic resins. Other injection molding methods such as gas-assisted injection molding and injection compression molding can also be used. Further, in-mold injection molding, gas counter pressure molding, double molding, sandwich molding, push-pull injection molding, or SCORIM can also be used. Injection molding methods usable in the present invention are not limited to those mentioned above.

The use of the injection-molded body obtained by the present invention is not limited to particular products, and exemplary products include tableware, materials for agriculture, parts of OA equipment, parts of home electric appliances, parts of automobiles, daily sundries, stationery products, bottle-shaped articles, extruded sheets, and profile extrusion products. Additionally, the injection-molded body obtained by the present invention is degradable in seawater because the resin component consists primarily of a poly(3-hydroxybutyrate) resin. Thus, the injection-molded body can be a solution to environmental problems caused by dumping of plastics at sea.

EXAMPLES

Hereinafter, the present invention will be described more specifically using Examples and Comparative Examples. The present invention is not limited to Examples in any respect.

The substances used in Examples and Comparative Examples are described below.

<Production Example of PHBH (A)>

Poly(3-hydroxybutyrate-co-3-hydroxyhexanoate) was produced by a culture production method as described in Patent Literature 1 using KNK-005 strain (see U.S. Pat. No. 7,384,766). After the culturing, the poly(3-hydroxybutyrate-co-3-hydroxyhexanoate) was collected from the culture fluid by a method as described in WO 2010/067543. The weight-average molecular weight Mw measured by GPC was $43\times10^4$.

<Production Example of PHBH (B)>

Poly(3-hydroxybutyrate-co-3-hydroxyhexanoate) was produced by a culture production method identical to that described in Example 1 of WO 2015/146195 except for the use of PKO (palm kernel oil) as the carbon source. The strain used was KNK-005 ΔphaZ1::Plac-phaCRe ΔphaZ2,6 described in Example 11 of WO 2015/146195. The weight-average molecular weight Mw measured by GPC was $45\times10^4$.

(Method for Measurement of Weight-Average Molecular Weight)

The weight-average molecular weight of each poly(3-hydroxybutyrate) resin was measured as follows. First, the poly(3-hydroxybutyrate) resin was dissolved in chloroform, and the solution was heated in a hot water bath at 60° C. for 0.5 hours and then filtered through a disposable filter made of PTFE and having a pore size of 0.45 μm. Subsequently, GPC analysis was conducted using the filtrate under the conditions listed below, and thus the weight-average molecular weight was determined.

GPC system: RI monitor (L-3000) manufactured by Hitachi

Columns: K-G (one column) and K-806 L (two columns) manufactured by Showa Denko K.K.

Sample concentration: 3 mg/ml

Eluent: Chloroform solution

Eluent flow rate: 1.0 ml/min

Sample injection rate: 100 μL,

Analysis time: 30 minutes

Standard sample: Standard polystyrene (Resin Raw Materials Used)

PHBH (A): Poly(3-hydroxybutyrate-co-3-hydroxyhexanoate) for which the difference between the melting point peak temperature and the melting point peak end temperature in differential scanning calorimetry analysis is less than 10° C., in particular 7° C. (3-hydroxyhexanoate content=5.8 mol/%)

PHBH (B): Poly(3-hydroxybutyrate-co-3-hydroxyhexanoate) for which the difference between the melting point peak temperature and the melting point peak end temperature in differential scanning calorimetry analysis is from 10 to 70° C., in particular 33° C. (3-hydroxyhexanoate content=6.8 mol/%)

Crystal nucleating agent: Pentaerythritol (Neulizer P manufactured by The Nippon Synthetic Chemical Industry Co., Ltd.)

Inorganic filler: Talc (MICRO ACE K1 manufactured by Nippon Talc Co., Ltd.)

(Evaluation by Differential Scanning Calorimetry Analysis)

An aluminum pan was charged with 4 to 10 mg of a sample, and the sample was subjected to differential scanning calorimetry analysis which used a differential scanning calorimeter and in which the sample was melted under a stream of nitrogen by increasing the temperature from 30 to 180° C. at a rate of 10° C./min. In the endothermic curve obtained by the calorimetry analysis, the temperature at which the amount of absorbed heat reached a maximum was determined as the melting point peak temperature, and the temperature at which the melting point peak ended and the endothermic process ceased to be observed was determined as the melting point peak end temperature.

(Methods for Evaluation of Injection Molding)

Method A: TOYO Si-30V (clamping force: 30 tons) was used as the injection molding machine. The mold used was a single-cavity mold for producing a small spoon with a length of 100 mm (side gate width 1 mm×thickness 1 mm).

Method B: TOYO Si-180V (clamping force: 180 tons) was used as the injection molding machine. The mold used was an eight-cavity mold for producing spoons with a length of 160 mm (side gate width 2 mm× thickness 1 mm).

(Method for Calculation of Injection Rate)

The injection capacity (cc) from the metering position to the injection-to-holding switching position during injection molding was divided by the injection time [sec] excluding the pressure holding time, and the resulting value was adopted as the injection rate.

(Method for Measurement of Material Temperature During Molding)

Purging (the step of retracting the nozzle from the mold and ejecting the molten resin) was performed after 30 shots of the molding material were molded successively under given molding conditions for evaluation, and the resin was then shaped into a sphere, the internal temperature of which was measured by a contact thermometer.

(Evaluation of Solidification Characteristics)

Injection molding was carried out in which the time of cooling in the mold was 20 seconds, and the injection-molded body released from the mold was evaluated as to whether the molded body was deformed. Deformation of the molded body during release from the mold indicates that the solidification characteristics of the molding material are insufficient.

Good: The molded body was not deformed.

Poor: The molded body was deformed.

(Evaluation of Mold Soiling)

After 30 shots of the molding material were molded successively, the mold surface that was in contact with the products was visually inspected.

Good: There was no substance adhering to the mold surface.

Poor: There was a substance adhering to the mold surface.

Example 1

PHBH (B) was melted at a barrel temperature of 160° C. and injection-molded. In this molding, the mold temperature was set to 45° C., and the molten resin was cooled for 20 seconds to solidify the resin. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Example 2

PHBH (B) was melted at a barrel temperature of 160° C. and injection-molded. In this molding, the mold temperature was set to 45° C., and the molten resin was cooled for 20 seconds to solidify the resin. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The evaluation results are shown in Table 1.

Example 3

100 parts by weight of PHBH (B) and 20 parts by weight of the inorganic filler were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Example 4

100 parts by weight of PHBH (B) and 20 parts by weight of the inorganic filler were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The evaluation results are shown in Table 1.

Example 5

100 parts by weight of PHBH (B) and 30 parts by weight of the inorganic filler were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Example 6

100 parts by weight of PHBH (B) and 30 parts by weight of the inorganic filler were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The evaluation results are shown in Table 1.

Example 7

100 parts by weight of PHBH (B) and 20 parts by weight of the inorganic filler were compounded into a resin-containing material, which was melted at a barrel temperature of 160° C. and injection-molded. In this molding, the mold temperature was set to 35° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Example 8

100 parts by weight of PHBH (B) and 20 parts by weight of the inorganic filler were compounded into a resin-containing material, which was melted at a barrel temperature of 160° C. and injection-molded. In this molding, the mold temperature was set to 60° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Example 9

100 parts by weight of PHBH (B) and 20 parts by weight of the inorganic filler were compounded into a resin-containing material, which was melted at a barrel temperature of 160° C. and injection-molded. In this molding, the mold temperature was set to 80° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 1.

Comparative Example 1

PHBH (A) was melted at a barrel temperature of 160° C. and injection-molded. In this molding, the mold temperature was set to 45° C., and the molten resin was cooled for 20 seconds to solidify the resin. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 2

100 parts by weight of PHBH (A) and 1 part by weight of pentaerythritol serving as a crystal nucleating agent were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 3

100 parts by weight of PHBH (A), 1 part by weight of pentaerythritol serving as a crystal nucleating agent, and 30 parts by weight of the inorganic filler were compounded into a resin-containing material, which was melted at a barrel temperature of 160° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 4

100 parts by weight of PHBH (A), 1 part by weight of pentaerythritol serving as a crystal nucleating agent, and 30 parts by weight of the inorganic filler were compounded into a resin-containing material, which was melted at a barrel temperature of 140° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 5

100 parts by weight of PHBH (A) and 1 part by weight of pentaerythritol serving as a crystal nucleating agent were compounded into a resin-containing material, which was melted at a barrel temperature of 160° C. and injection-molded. In this molding, the mold temperature was set to 25° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 6

100 parts by weight of PHBH (A), 1 part by weight of pentaerythritol serving as a crystal nucleating agent, and 30 parts by weight of the inorganic filler were compounded into a resin-containing material, which was melted at a barrel temperature of 160° C. and injection-molded. In this molding, the mold temperature was set to 25° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 7

PHBH (B) was melted at a barrel temperature of 160° C. and injection-molded. In this molding, the mold temperature was set to 25° C., and the molten resin was cooled for 20 seconds to solidify the resin. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 8

100 parts by weight of PHBH (B) and 30 parts by weight of the inorganic filler were compounded into a resin-containing material, which was melted at a barrel temperature of 160° C. and injection-molded. In this molding, the mold temperature was set to 25° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method A. The evaluation results are shown in Table 2.

Comparative Example 9

100 parts by weight of PHBH (B) and 30 parts by weight of the inorganic filler were compounded into a resin-containing material, which was melted at a barrel temperature of 160° C. and injection-molded. In this molding, the mold temperature was set to 25° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The evaluation results are shown in Table 2.

Comparative Example 10

PHBH (B) was melted at a barrel temperature of 170° C. and injection-molded. In this molding, the mold temperature was set to 45° C., and the molten resin was cooled for 20 seconds to solidify the resin. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The molding by Method B was performed at a further increased injection rate. The evaluation results are shown in Table 2.

Comparative Example 11

PHBH (B) and the inorganic filler were compounded into a resin-containing material, which was melted at a barrel temperature of 170° C. and injection-molded. In this molding, the mold temperature was set to 45° C., and the molten resin-containing material was cooled for 20 seconds to solidify the material. After the cooling, the mold was opened to release the injection-molded body from the mold, and the solidification characteristics of the injection-molded body were evaluated. A number of molded bodies corresponding to 30 shots were obtained under the same conditions, and then the mold was checked for any substance adhering to its inner mirror-finished surface. The molding machine and mold used were those of Method B. The molding by Method B was performed at a further increased injection rate. The evaluation results are shown in Table 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| PHBH (A) [parts by weight] |  |  |  |  |  |  |  |  |  |
| PHBH (B) [parts by weight] | 100 | 100 | 100 | 100 | 100 | 100 | 100 | 100 | 100 |
| Crystal nucleating agent [parts by weight] |  |  |  |  |  |  |  |  |  |
| Inorganic filler [parts by weight] |  |  | 20 | 20 | 30 | 30 | 20 | 20 | 20 |
| HH content [mol %] | 6.8 | 6.8 | 6.8 | 6.8 | 6.8 | 6.8 | 6.8 | 6.8 | 6.8 |
| Melting point peak temperature [° C.] | 140 | 140 | 140 | 140 | 139 | 139 | 140 | 140 | 140 |
| Melting point peak end temperature [° C.] | 173 | 173 | 172 | 172 | 172 | 172 | 172 | 172 | 172 |
| Difference between melting point peak temperature and melting point peak end temperature [° C.] | 33 | 33 | 32 | 32 | 33 | 33 | 32 | 32 | 32 |
| Injection rate [cc/sec] | 1.3 | 20 | 1.3 | 20 | 1.3 | 14 | 1.3 | 1.3 | 1.3 |
| Mold temperature [° C.] | 45 | 45 | 45 | 45 | 45 | 45 | 35 | 60 | 80 |
| Material temperature during molding [° C.] | 163 | 169 | 164 | 168 | 165 | 168 | 165 | 164 | 164 |
| Types of molding machine and mold | A | B | A | B | A | B | A | A | A |
| Solidification characteristics | Good | Good | Good | Good | Good | Good | Good | Good | Good |
| Mold soiling | Good | Good | Good | Good | Good | Good | Good | Good | Good |

TABLE 2

|  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 | Comp. Example 11 |
|---|---|---|---|---|---|---|---|---|---|---|---|
| PHBH (A) [parts by weight] | 100 | 100 | 100 | 100 | 100 | 100 |  |  |  |  |  |
| PHBH (B) [parts by weight] |  |  |  |  |  |  | 100 | 100 | 100 | 100 | 100 |
| Crystal nucleating agent [parts by weight] | 1 | 1 | 1 | 1 | 1 |  |  |  |  |  |  |

TABLE 2-continued

| | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 | Comp. Example 11 |
|---|---|---|---|---|---|---|---|---|---|---|---|
| Inorganic filler [parts by weight] | | | 30 | 30 | | 30 | | 30 | 30 | | 30 |
| HH content [mol %] | 5.8 | 5.8 | 5.8 | 5.8 | 5.8 | 5.8 | 6.8 | 6.8 | 6.8 | 6.8 | 6.8 |
| Melting point peak temperature [° C.] | 143 | 146 | 140 | 140 | 146 | 140 | 140 | 139 | 139 | 140 | 139 |
| Melting point peak end temperature [° C.] | 150 | 151 | 149 | 149 | 151 | 149 | 173 | 172 | 172 | 173 | 172 |
| Difference between melting point peak temperature and melting point peak end temperature [° C.] | 7 | 5 | 9 | 9 | 5 | 9 | 33 | 33 | 33 | 33 | 33 |
| Injection rate [cc/sec] | 1.3 | 1.3 | 1.3 | 1.3 | 1.3 | 1.3 | 1.3 | 1.3 | 14 | 45 | 40 |
| Mold temperature [° C.] | 45 | 45 | 45 | 45 | 25 | 25 | 25 | 25 | 25 | 45 | 45 |
| Material temperature during molding [° C.] | 167 | 165 | 169 | 141 | 165 | 169 | 163 | 165 | 168 | 178 | 180 |
| Types of molding machine and mold | A | A | A | A | A | A | A | A | B | B | B |
| Solidification characteristics | Poor | Good | Good | Good | Poor | Poor | Poor | Poor | Poor | Poor | Poor |
| Mold soiling | Good | Poor | Poor | Poor | Poor | Poor | Good | Good | Good | Good | Good |

In Examples 1 to 9, as seen from Table 1, the speed of crystallization and solidification was high, the solidification characteristics were good, and the injection-molded bodies were successfully produced without mold soiling. Referring to Table 2, the solidification characteristics were insufficient in Comparative Example 1 where the poly(3-hydroxybutyrate) resin used was one for which the difference between the melting point peak temperature and the melting point peak end temperature was less than 10° C. and where the material temperature during injection molding was above the melting point peak end temperature. In Comparative Examples 2 to 4, which differed from Comparative Example 1 in that pentaerythritol serving as a crystal nucleating agent was added, mold soiling occurred although the solidification characteristics were improved. In Comparative Examples 5 and 6, which differed from Comparative Examples 2 and 3 in that the mold temperature was as low as 25° C., the mold soiling was not ameliorated, and the solidification characteristics were insufficient. In Comparative Examples 7 to 9, the solidification characteristics were insufficient as a result of the mold temperature being as low as 25° C., although the resin used was the same as that in Examples and the material temperature during injection molding was also similar to those in Examples. In Comparative Examples 10 and 11, the solidification characteristics were insufficient as a result of the material temperature during injection molding being above the melting point peak end temperature, although the resin used was the same as that in Examples and the mold temperature was also the same as that in some of Examples.

The invention claimed is:

1. A method for producing an injection-molded body from a molding material comprising a poly(3-hydroxybutyrate) resin, the method comprising:
    melting the molding material by heating the molding material to a temperature (A) between a melting point peak temperature and a melting point peak end temperature in differential scanning calorimetry analysis of the molding material, wherein the temperature (A) is an actual temperature of the molding material during melting, and a difference between the melting point peak temperature and the melting point peak end temperature of the molding material is from 10 to 70° C.;
    injecting the molten molding material into a mold having a temperature of from 30 to 80° C.; and
    cooling the molding material in the mold to crystallize and solidify the molding material,
    wherein the molding material does not contain a crystal nucleating agent consisting of pentaerythritol.

2. The method according to claim 1, wherein in the injecting, the molten molding material is injected into the mold at an injection rate of from 1 to 30 cc/sec.

3. The method according to claim 1, wherein the poly(3-hydroxybutyrate) resin comprises poly(3-hydroxybutyrate-co-3-hydroxyhexanoate).

4. The method according to claim 1, wherein the molding material comprises from 0 to 40 parts by weight of an inorganic filler per 100 parts by weight of the poly(3-hydroxybutyrate) resin.

5. The method according to claim 4, wherein the inorganic filler is a silicate.

6. The method according to claim 5, wherein the silicate is at least one selected from the group consisting of talc, mica, kaolinite, montmorillonite, and smectite.

7. The method according to claim 2, wherein the poly(3-hydroxybutyrate) resin comprises poly(3-hydroxybutyrate-co-3-hydroxyhexanoate).

8. The method according to claim 1, wherein the difference between the melting point peak temperature and the melting point peak end temperature of the molding material is from 12 to 50° C.

9. The method according to claim 1, wherein the difference between the melting point peak temperature and the melting point peak end temperature of the molding material is from 20 to 35° C.

10. The method according to claim 1, wherein the difference between the melting point peak temperature and the melting point peak end temperature of the molding material is from 25 to 33° C.

11. The method according to claim 4, wherein the inorganic filler has a water content of from 0.01 to 10%.

12. The method according to claim 4, wherein the inorganic filler has an average particle size of from 0.1 to 50 µm.

13. The method according to claim 4, wherein the molding material comprises from 0 to 30 parts by weight of the inorganic filler per 100 parts by weight of the poly(3-hydroxybutyrate) resin.

14. The method according to claim 1, wherein in the injecting, the molten molding material is injected into the mold at an injection rate of from 1 to 20 cc/sec.

15. The method according to claim 1, wherein in the injecting, the molten molding material is injected into the mold having a temperature of 35 to 70° C.

16. The method according to claim 1, wherein in the injecting, the molten molding material is injected into the mold having a temperature of 40 to 50° C.

17. The method according to claim 1, wherein in the melting of the molding material, the poly(3-hydroxybutyrate) resin is molten to such a degree that the resin is injection-moldable and at the same time allow some resin crystals to remain in the molten resin.

* * * * *